US007609887B2

(12) United States Patent
Liang et al.

(10) Patent No.: US 7,609,887 B2
(45) Date of Patent: Oct. 27, 2009

(54) SYSTEM AND METHOD FOR TOBOGGAN-BASED OBJECT SEGMENTATION USING DISTANCE TRANSFORM

(75) Inventors: Jianming Liang, Paoli, PA (US); Luca Bogoni, Philadelphia, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 834 days.

(21) Appl. No.: 11/145,888

(22) Filed: Jun. 6, 2005

(65) Prior Publication Data

US 2005/0271276 A1 Dec. 8, 2005

Related U.S. Application Data

(60) Provisional application No. 60/577,525, filed on Jun. 7, 2004.

(51) Int. Cl.
*G06K 9/34* (2006.01)
(52) U.S. Cl. .................. 382/173; 382/164; 382/180
(58) Field of Classification Search ............ 382/164, 382/173, 180; 358/538
See application file for complete search history.

(56) References Cited

U.S. PATENT DOCUMENTS

| 5,889,881 | A  | * | 3/1999 | MacAulay et al. ........... 382/133 |
| 5,949,905 | A  | * | 9/1999 | Nichani et al. .............. 382/173 |
| 6,718,054 | B1 | * | 4/2004 | Lorigo et al. ................ 382/128 |
| 6,766,037 | B1 | * | 7/2004 | Le et al. ..................... 382/107 |
| 6,845,260 | B2 | * | 1/2005 | Liu et al. .................... 600/410 |
| 6,907,436 | B2 | * | 6/2005 | Ye et al. ..................... 707/203 |
| 7,315,639 | B2 | * | 1/2008 | Kuhnigk ..................... 382/131 |
| 7,374,536 | B1 | * | 5/2008 | Taylor ........................ 600/300 |
| 2002/0146166 | A1 | * | 10/2002 | Rao et al. ................... 382/164 |
| 2003/0105395 | A1 | * | 6/2003 | Fan et al. .................... 600/425 |
| 2003/0223627 | A1 | * | 12/2003 | Yoshida et al. .............. 382/128 |

FOREIGN PATENT DOCUMENTS

WO    WO 02/29717    4/2002

OTHER PUBLICATIONS

Fairfield ("Tobbogan contrast enhancement for contrast segmentation," 10th ICPR, Jun. 16-21, 1990, pp. 712-716).*
Mortensen E. et al., "Adaptive Boundary Detection Using 'live-wire' two-dimensional Dynamic Programming", *Computers in Cardiology*, Oct. 11, 1992, pp. 635-638.
Roerdink J. B. T. M. et al.; "The Watershed Transform: Definitions, Algorithms and Parallelization Strategies", *Fundamenta Informaticae*, vol. 41, 2001, pp. 187-228.
Carvalho B. M. et al., "A Segmentation-Based Automatic Navigation Technique For Virtual Endoscopy", *Biomedical Imaging: Macro to Nano, 2004*, Apr. 15, 2004, pp. 1541-1544.
Meyer F., "Skeletons and Watershed Lines in Digital Spaces", *Proceedings of the SPIE*, vol. 1350, Jul. 10, 1990, pp. 85-102.
International Search Report including Notification of Transmittal of the International Search Report, International Search Report and Written Opinion of the International Searching Authority (Oct. 14, 2005).

* cited by examiner

*Primary Examiner*—Yubin Hung

(57) ABSTRACT

A method of segmenting an object in a digital image comprising providing a digital image comprising a plurality of intensities corresponding to a domain of points in a N-dimensional space, selecting a region of interest in the image, determining a threshold intensity value for points in said region of interest, wherein an object of interest is defined by points with an intensity above a first pre-determined threshold, computing a distance map for each point in said object of interest, tobogganing each point in said object of interest based on said distance map, and selecting a cluster based on the results of said tobogganing.

28 Claims, 8 Drawing Sheets

| | | | | | | | | |
|---|---|---|---|---|---|---|---|---|
| 538 | 518 | 516 | 524 | 534 | 520 | 506 | 526 | 534 |
| 509 | 525 | 336 | 311 | 321 | 328 | 328 | 533 | 523 |
| 524 | 332 | 302 | 309 | 308 | 317 | 315 | 326 | 515 |
| 519 | 337 | 314 | 301 | 327 | 312 | 334 | 314 | 528 |
| 536 | 330 | 333 | 330 | 534 | 308 | 334 | 312 | 522 |
| 530 | 307 | 300 | 518 | 501 | 508 | 324 | 314 | 518 |
| 518 | 316 | 306 | 537 | 527 | 527 | 320 | 321 | 528 |
| 501 | 337 | 508 | 519 | 515 | 512 | 536 | 329 | 525 |
| 533 | 537 | 508 | 517 | 533 | 522 | 533 | 512 | 532 |

SYSTEM AND METHOD FOR TOBOGGAN-BASED OBJECT SEGMENTATION USING DISTANCE TRANSFORM

CROSS REFERENCE TO RELATED UNITED STATES APPLICATIONS

This application claims priority from "Toboggan-based Object Segmentation using Distance Transform", U.S. Provisional Application No. 60/577,525 of Liang, et al., filed Jun. 7, 2004, the contents of which are incorporated herein by reference.

TECHNICAL FIELD

This invention is directed to toboggan-based object segmentation in digital medical images.

DISCUSSION OF THE RELATED ART

The diagnostically superior information available from data acquired from current imaging systems enables the detection of potential problems at earlier and more treatable stages. Given the vast quantity of detailed data acquirable from imaging systems, various algorithms must be developed to efficiently and accurately process image data. With the aid of computers, advances in image processing are generally performed on digital or digitized images.

Digital images are created from an array of numerical values representing a property (such as a grey scale value or magnetic field strength) associable with an anatomical location points referenced by a particular array location. The set of anatomical location points comprises the domain of the image. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels.

The process of classifying, identifying, and characterizing image structures is known as segmentation. Once anatomical regions and structures are identified by analyzing pixels and/or voxels, subsequent processing and analysis exploiting regional characteristics and features can be applied to relevant areas, thus improving both accuracy and efficiency of the imaging system. One method for characterizing shapes and segmenting objects is based on tobogganing. Tobogganing is a non-iterative, single-parameter, linear execution time over-segmentation method. It is non-iterative in that it processes each image pixel/voxel only once, thus accounting for the linear execution time. The sole input is an image's 'discontinuity' or 'local contrast' measure, which is used to determine a slide direction at each pixel. One implementation of tobogganing uses a toboggan potential for determining a slide direction at each pixel/voxel. The toboggan potential is computed from the original image, in 2D, 3D or higher dimensions, and the specific potential depends on the application and the objects to be segmented. One simple, exemplary technique for defining a toboggan potential would be as the intensity difference between a given pixel and its nearest neighbors. Each pixel is then 'slid' in a direction determined by a maximun (or minimum) potential. All pixels/voxels that slide to the same location are grouped together, thus partitioning the image volume into a collection of voxel clusters. Tobogganing can be applied to many different anatomical structures and different types of data sets, e.g. CT, MR, PET etc., on which a toboggan type potential can be computed.

SUMMARY OF THE INVENTION

Exemplary embodiments of the invention as described herein generally include methods and systems for toboggan-based object segmentation using a distance transform (TBOS-DT). These methods include performing a distance transform to form a distance map, tobogganing with the distance map as the toboggan potential, combining the formed toboggan clusters based on the distance map, and extracting the objects of interest. According to one embodiment of the invention, a TBOS-DT for extracting polyps in virtual colonoscopy includes computing a distance map, virtually sliding each voxels into its neighborhood based on the distance map, collecting all voxels that converge to the same location to form a toboggan cluster, and extracting polyps based on the formed toboggan clusters.

According to an aspect of the invention, there is provided a method for segmenting an object in a digital image, including providing a digital image comprising a plurality of intensities corresponding to a domain of points in a N-dimensional space, computing a distance map for a plurality of points in said image, tobogganing each of said plurality of points in said image based on said distance map, and selecting a cluster based on the results of said tobogganing.

According to a further aspect of the invention, the method further comprises selecting a region of interest in the image, wherein said distance map is computed for points in said region of interest.

According to a further aspect of the invention, the method further comprises imposing a constraint on the intensity values of the points in said region of interest, wherein an object of interest is defined by points that satisfy said constraint.

According to a further aspect of the invention, the method further comprises binarizing said region of interest based on said constraint, wherein pixels whose intensity value satisfy said constraint are assigned one binary value, and pixels whose intensity value do not satisfy said constraint are assigned another binary value.

According to a further aspect of the invention, said constraint takes the form of an inequality relationship between a pixel value and one or more threshold values.

According to a further aspect of the invention, said distance map for each point is determined by the distance of each point in said object of interest to a nearest point outside said object of interest.

According to a further aspect of the invention, said distance map is a Euclidean distance.

According to a further aspect of the invention, tobogganing each point comprises sliding each point towards a nearest neighbor point with a largest distance magnitude.

According to a further aspect of the invention, a point whose distance magnitude is greater than that of its nearest neighbors is a concentration location that does not slide.

According to a further aspect of the invention, a cluster is defined by a group of points that all slide to a same concentration location.

According to a further aspect of the invention, the method further comprises selecting a plurality of clusters, and merging said plurality of clusters into a single cluster.

According to a further aspect of the invention, merging said plurality of clusters includes selecting one of said plurality of clusters, and labeling the points in said selected cluster with a set of labels, identifying surface points within the selected cluster, wherein a surface point is a point on a border of said object of interest, computing a centroid of the surface points, and adding to said set of labels those labels corresponding to points within a preset distance from said centroid.

According to a further aspect of the invention, said steps of identifying surface points, computing a centroid, and adding to said set of labels are repeated until no new labels are added to the set of labels, and further comprising extracting said object of interest as defined by said surface points.

According to a further aspect of the invention, said inequality includes a first threshold value and a second threshold value greater than said first threshold value, said object of interest is further defined by points with an intensity above said first threshold value and below a second pre-determined threshold, and further comprising forming a ternary map of said image, wherein pixels whose intensity is below said first threshold are assigned a first ternary value, pixels whose intensity is equal to or above said second threshold are assigned a second ternary value, and pixels whose intensity is between said first threshold and said second threshold are assigned a third intensity value, wherein said distance is computed for those pixels corresponding to the third ternary value.

According to a further aspect of the invention, the distance map for each point in said object of interest is determined by the distance of each point in said object of interest to a nearest point- with a first ternary value.

According to a further aspect of the invention, the method further comprises determining a distance threshold, and tobogganing only those pixels in the object of interest whose distance map is less than the distance threshold.

According to another aspect of the invention, there is provided a program storage device readable by a computer, tangibly embodying a program of instructions executable by the computer to perform the method steps for segmenting an object in a digital image.

BRIEF DESCRIPTION OF THE DRAWINGS

FIG. 3 depicts a binarized version of the image of FIG. 1, with a given threshold, according to an embodiment of the invention.

FIG. 4 depicts a distance map based on applying the distance transform the binary image in FIG. 3, according to an embodiment of the invention.

DETAILED DESCRIPTION OF THE PREFERRED EMBODIMENTS

Exemplary embodiments of the invention as described herein generally include systems and methods for performing a toboggan-based object segmentation using a distance transform to find and characterize shapes in digital medical images. Although an exemplary embodiment of this invention is discussed in the context of segmenting and characterizing the colon and in particular colon polyps, it is to be understood that the toboggan-based object segmentation methods presented herein have application to 3D CT images, and to images from different modalities of any dimensions on which a gradient field can be computed and toboggan can be performed.

Toboggan-based object segmentation using distance transform (TBOS-DT), starts with an object of interest has been located with a manual or automatic procedure. According to an embodiment of the invention as applied to segmenting polyps in virtual colonoscopy, a polyp candidate can be manually clicked by a user with a mouse, or automatically detected by a detection software module. The output given by TBOS-DT are the pixels that comprise the segmented object, which can be directly displayed to a user, or can serve as input to another module for further processing. Examples of further processing include computing measurements of the object, such as its longest linear dimension, its volume, moments of the intensity, etc. In other words, the first step for automated polyp measurement is polyp segmentation.

Figures 1, 2:
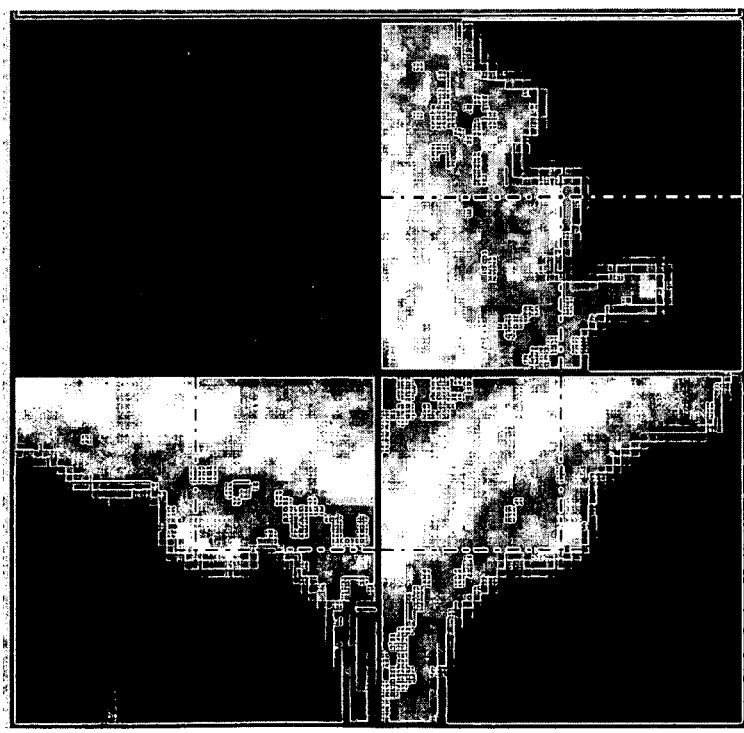
FIG. 1 depicts a 2D artificial image created to resemble a small cross-section colon with a polyp surrounded by lumen, according to an embodiment of the invention.
FIG. 2 depicts three orthogonal views for a real volume extracted from a 3D CT image of colon, according to an embodiment of the invention.
Figure 9:
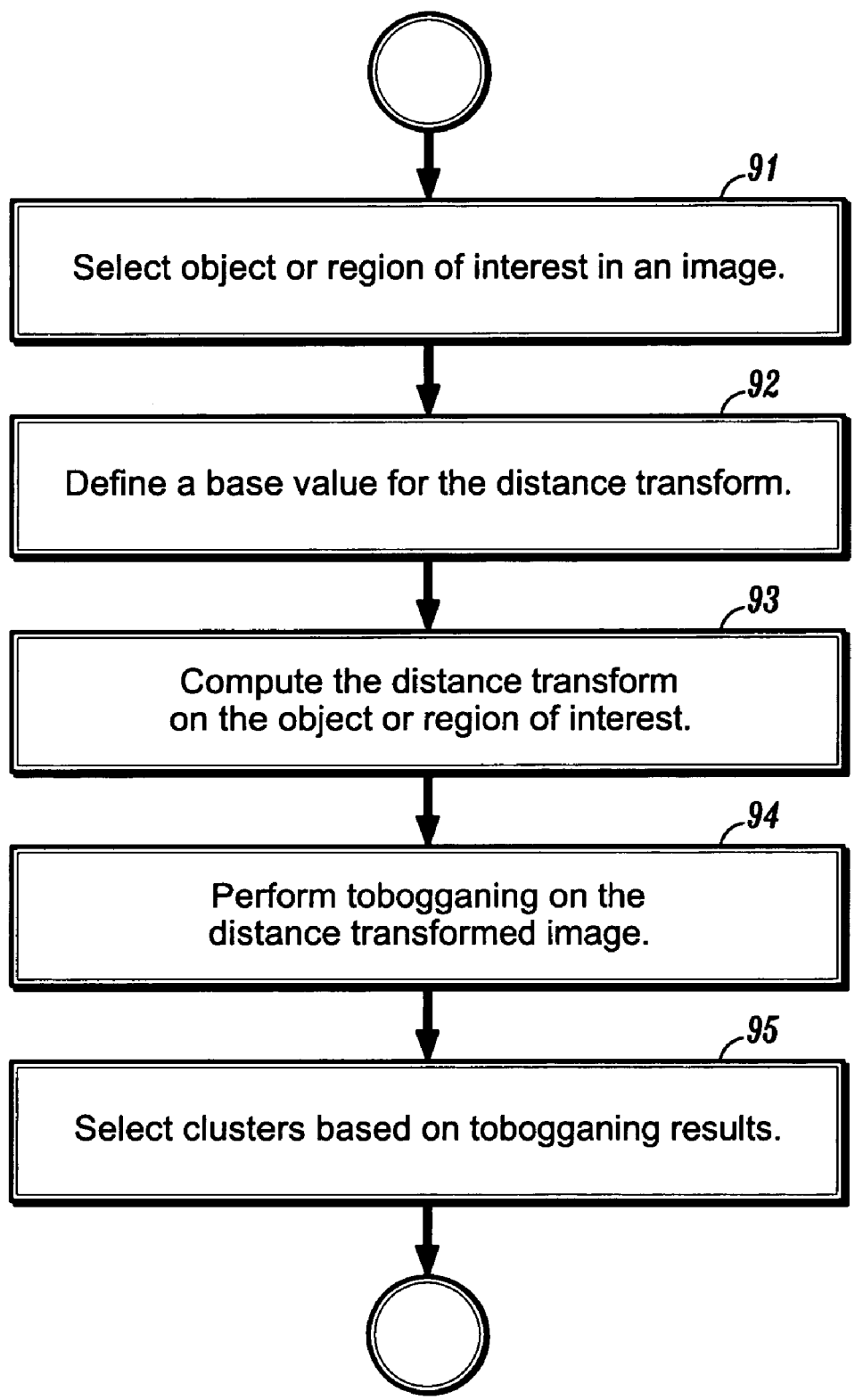
FIG. 9 depicts a flow chart of a toboggan-based method for polyp segmentation using distance transform, according to an embodiment of the invention.

FIG. 9 depicts a flow chart of a toboggan-based method for polyp segmentation using distance transform according to an embodiment of the invention. This embodiment will be discussed with respect to 2D and 3D artificial images. At step 91, an object of interest or a region in an image is selected. FIG. 1 depicts a 2D artificial image created to resemble a small cross-section colon with a polyp surrounded by lumen. The polyp is represented by tissue values above 500 for this example, and the lumen is represented by the darker area, with tissue values below 500. FIG. 2 depicts three orthogonal views for a real volume extracted from a 3D CT image of colon. The intersection of the dotted lines identifies an actual structure of interest.

Figure 3:
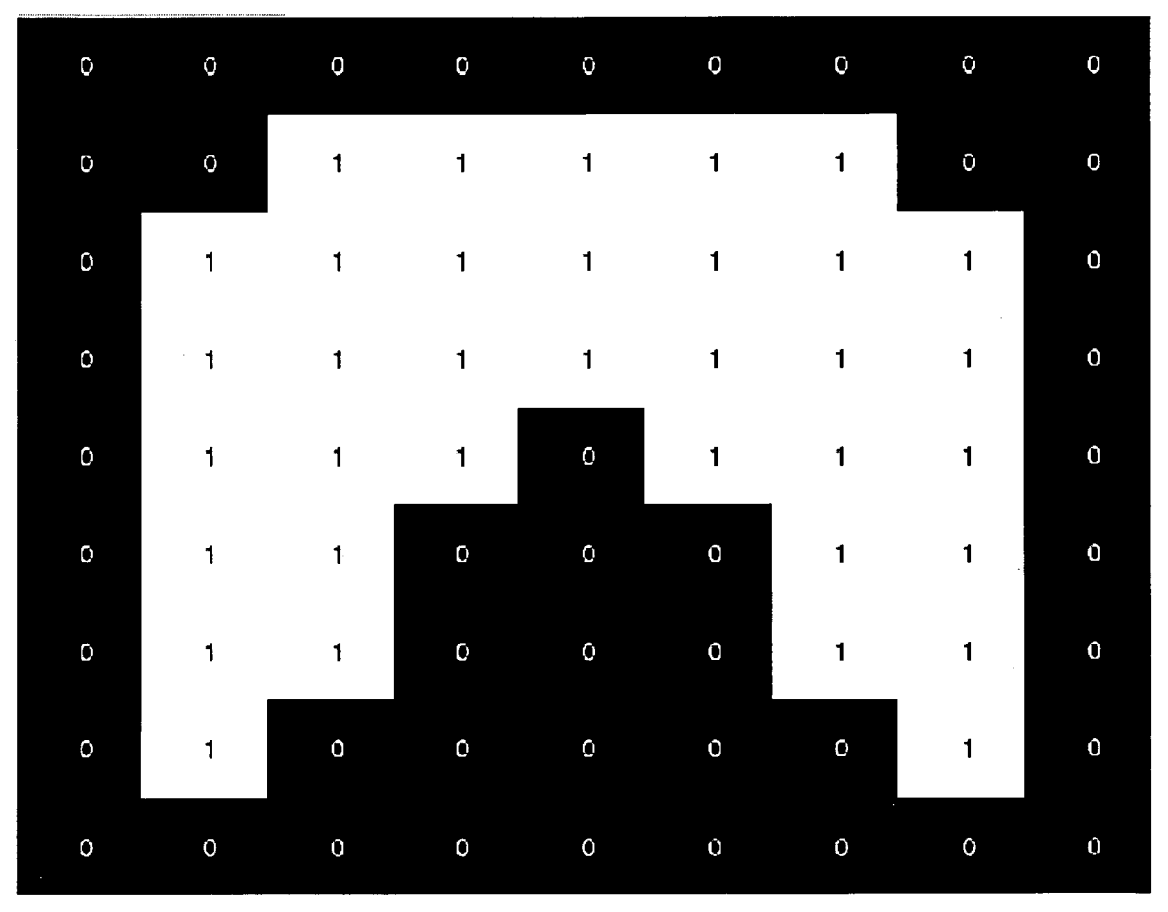

At step 92, a base value is defined for the distance transform computation. The distance transform defines the distance for every point in the image relative to a reference location. The reference locations can be chosen with respect to one or more base or minimal values. According to an embodiment of the invention, the distance transform can be computed with respect to an area, for example, relative to the lumen area, and the image can be binarized into a lumen region and a non-lumen region. The distance transform will be applied only to those pixels or voxels in the non-lumen region. FIG. 3 depicts a binarized version of the image of FIG. 1, with a given threshold. In this example, the binarization is obtained by thresholding with a value of 500. Every pixel below this threshold is regarded as lumen and is set to one and every pixel above is set to zero. Those pixels whose intensity is above the threshold comprise an object of interest. Note that the assignment of particular binary values is arbitrary and non-limiting, and pixels with intensities below the threshold could be set to zero and those above the threshold could be set to one.

Figure 4:
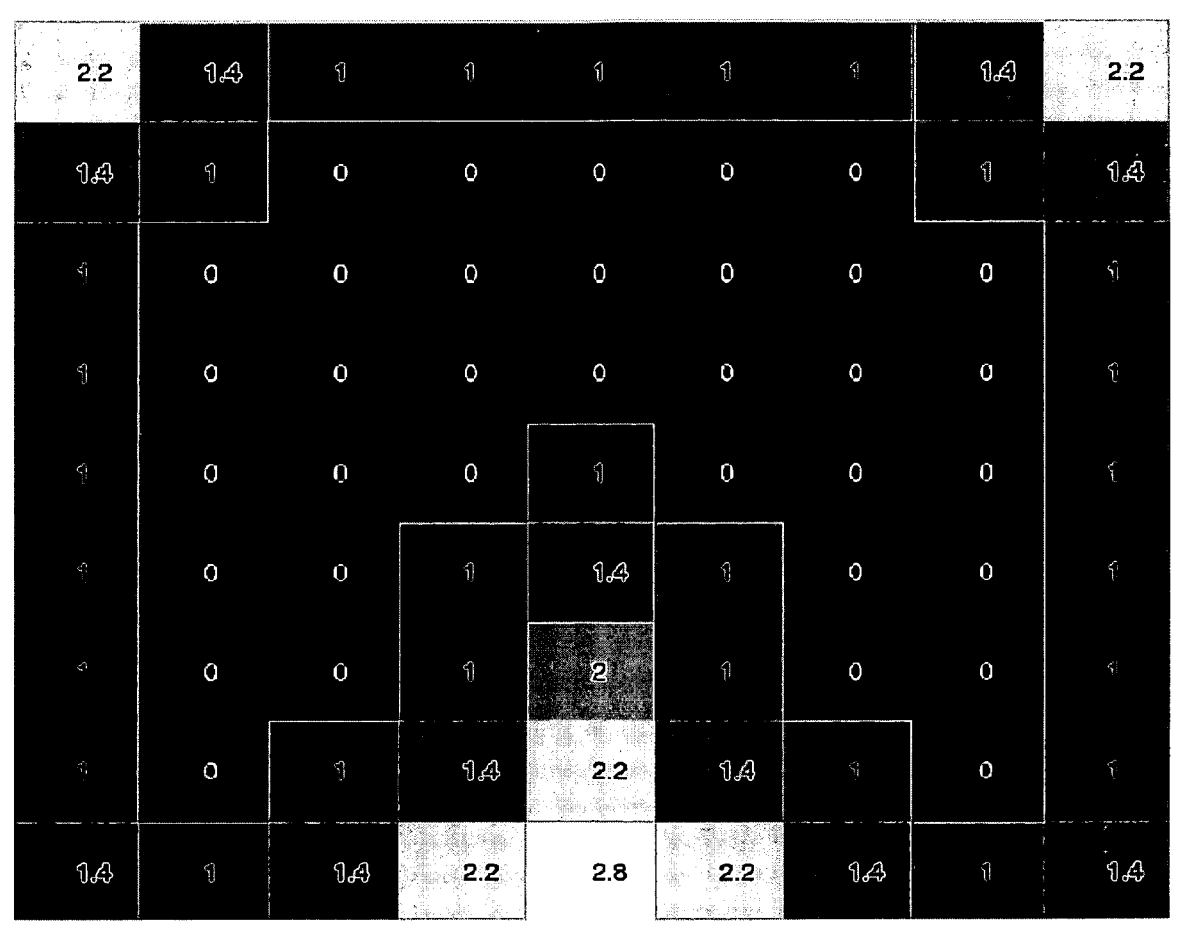
Figure 5:
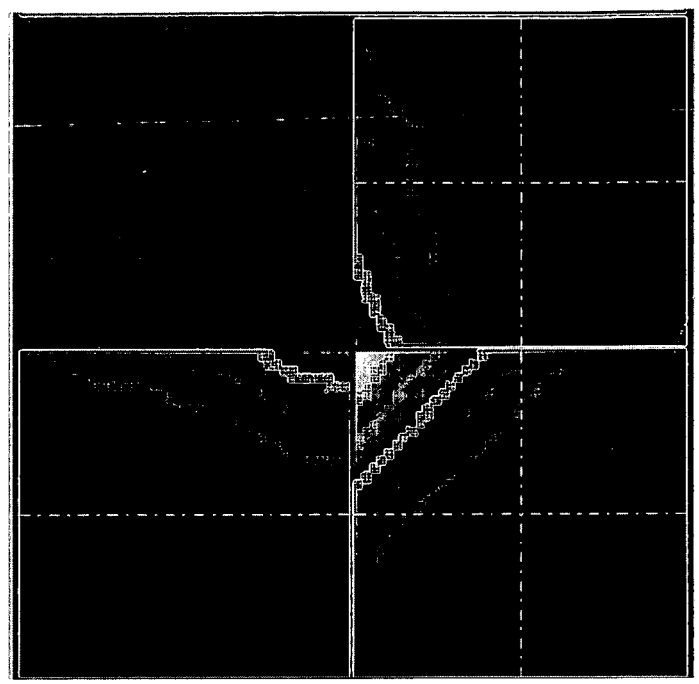
FIG. 5 depicts three orthogonal views illustrating a distance transform map computed on the 3D volume shown in FIG. 2, according to an embodiment of the invention.

At step 93, a distance map is computed based on the binarized image shown in FIG. 3. The distance transform assigns each pixel in FIG. 3 a number that is the distance between that pixel and the nearest nonzero pixel, yielding a distance map. FIG. 4 depicts a distance map based on applying the distance transform to the binary image in FIG. 3. FIG. 5 depicts three orthogonal views illustrating a distance transform map computed on the 3D volume shown in FIG. 2. Referring to FIG. 5, looking at the bottom right orthogonal view, the area toward the corner is brighter since that point is the furthest from the lumen area. Notice also a faint profile of the structure. In general, the distance can be computed by treating the binarized image as a rectangular grid in an N-dimensional space. In the embodiments depicted herein, the grid can be considered as a 2D grid with coordinates (x, y), and the distance d between two pixels $(x_1, y_1)$ and $(x_2, y_2)$ can be defined according to the Euclidean distance $d=\sqrt{(x_1-x_2)^2+(y_1-y_2)^2}$. Similarly, a 3D image can be represented as a 3D grid with coordinates (x, y, x), and the distance between two voxels $(x_1, y_1, z_1)$ and $(x_2, y_2, z_2)$ is $d=\sqrt{(x_1-x_2)^2+(y_1-y_2)^2+(z_1-z_2)^2}$. This distance metric is exemplary, and other distance metrics are within the scope of an embodiment of the invention.

Figure 6:
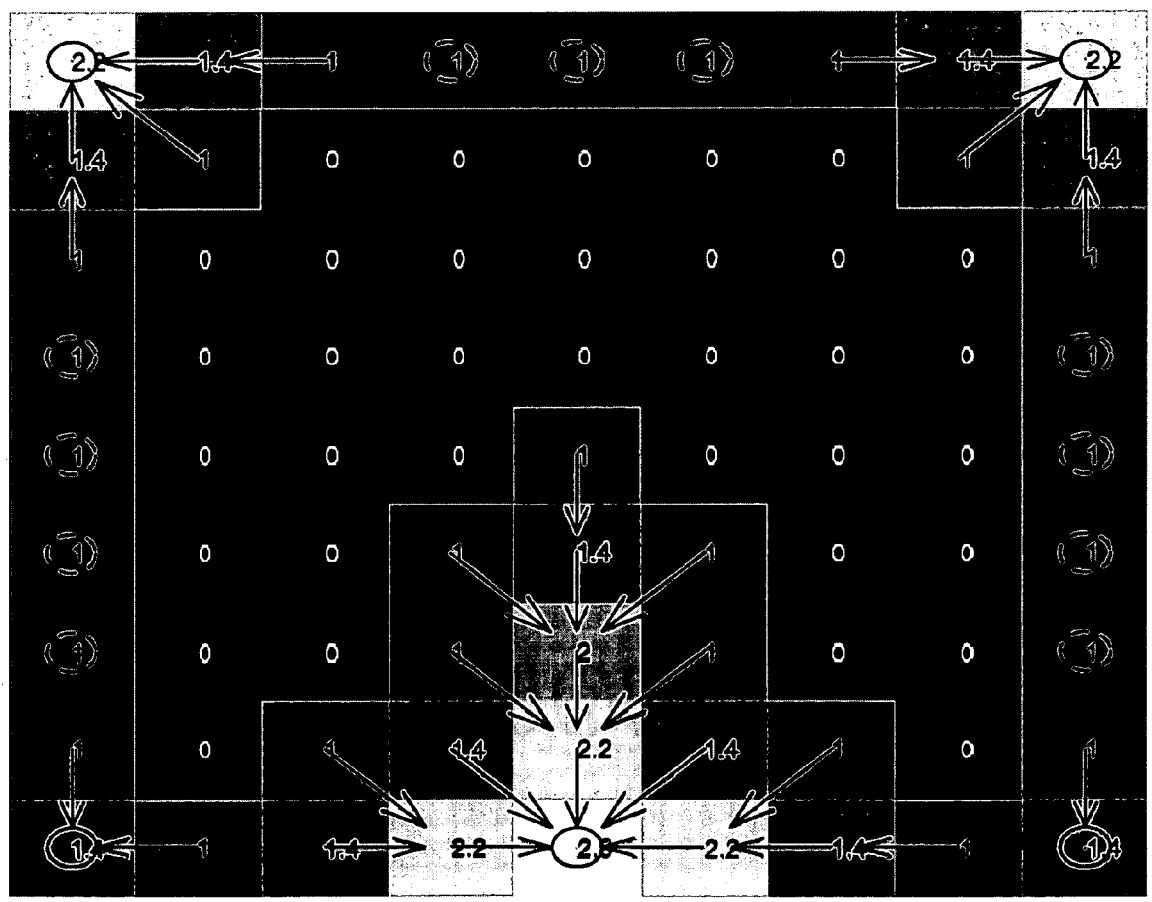
FIG. 6 shows the resulting clusters formed by the DT based tobogganing, according to an embodiment of the invention.

At step 94, tobogganing is performed on the distance transformed map. Each voxel in the volume slides/climbs to one of its nearest neighbors according to the computed potential. In general, the nearest neighbors of a pixel or voxel are those pixels/voxels that immediately surround the given pixel/voxel. For the embodiments of the invention disclosed herein, each 2D pixel will have 8 nearest neighbors, while each 3D voxel will have up to 26 nearest neighbors. Note however, that for other applications and embodiments, diagonally oriented pixels could be excluded from the nearest neighbor set. The selection of a neighbor depends on the application and the computation of toboggan potential. In the case of polyp segmentation, where the distance map is used as the toboggan potential, the slide direction is determined by the neighbor pixel with a maximal potential, that is, each voxel is climbing in the potential. If a voxel has a higher potential than any of its neighbors, it does not climb further and becomes a concentration location. This process generates the toboggan direction and the toboggan label for each voxel for a given distance map. All the voxels that climb to the same concentration location are associated with a unique cluster label and grouped into one toboggan cluster. FIG. 6 shows the resulting clusters formed by the DT based tobogganing. The arrows in the figure indicate the sliding direction of the cluster pixels, while the circled pixels are the concentration locations. Among them, there are 16 total clusters, with 11 single-pixel clusters marked in dashed circles. The concentration location of each cluster is circled. Some of the clusters contain only one pixel while others are larger. No tobogganing is performed on pixels with zero potential.

According to another embodiment of the invention, the tobogganing process can be restricted to a local neighborhood based on a particular application. That is, it is not necessary for all the voxels to slide/climb in the sub-volume. For example, in case of polyp segmentation, only voxels in the region along the colon wall are of interest, and there is no need for a voxel in the air (or on the bone) to slide/climb. These voxels can be pre-thresholded out based on known intensity values and related Houndsfield Units (HU) associated with lumen and bone.

For example, consider an embodiment of the invention with an image where pixel intensity values below $i_1$ are known to be lumen, and pixel intensity values above $i_2$, where $i_2 > i_1$, are known to be bone. This image could be transformed according to a ternary map, where pixels whose intensities are less than $i_1$ are assigned value 0, those pixels with intensity greater than or equal $i_1$ but less than or equal $i_2$ are assigned value 1, and those pixels with intensity greater than $i_2$ are assigned value 2. The distance map could then be computed only on those pixels with ternary value 1, based on their distance from a pixel with ternary value 0.

More generally, according to another embodiment of the invention, an object of interest can be determined by a constraint involving a pixel's intensity value and one or more threshold values. These constraints can determine multiple regions, one or more of which can be a region of interest. These constraints can most conveniently take the form of an inequality relationship between the pixel intensity value and the one or more threshold values. In the binary case described above, these constraints can take the form of simple inequalities, such as intensity<threshold or intensity>threshold, or in the ternary case, threshold1<intensity<threshold2. The constraints can include compound inequalities such as (threshold1<intensity<threshold2 OR threshold3<intensity<threshold4). These examples are non-limiting, and in general, any Boolean expression comprising one or more relational expressions involving a pixel intensity and one or more thresholds, where multiple relational expressions are joined by logical operators, can be a constraint within the scope of an embodiment of the invention.

In addition, according to another embodiment of the invention, the distance map can also be thresholded, so that any voxel with larger distance than a chosen value is not processed. Thus, thresholding can not only refine the areas to be processed but also remove unnecessary computation, thus accelerating the tobogganing process.

At step 95, the polyp is extracted by selecting the toboggan clusters. One toboggan cluster usually corresponds to an object of interest. However, there can be cases where the object of interest is broken into multiple toboggan clusters and a merging strategy would be required. Basically, those toboggan clusters which together represent the object of interest need to be merged into one big cluster. Various criteria can be used for selecting toboggan clusters for merging. For example, those toboggan clusters concentrated within a certain distance from the detection location can be selected. More sophisticated approaches, e.g., one based on the student's t-test, can also be used.

Figure 7:
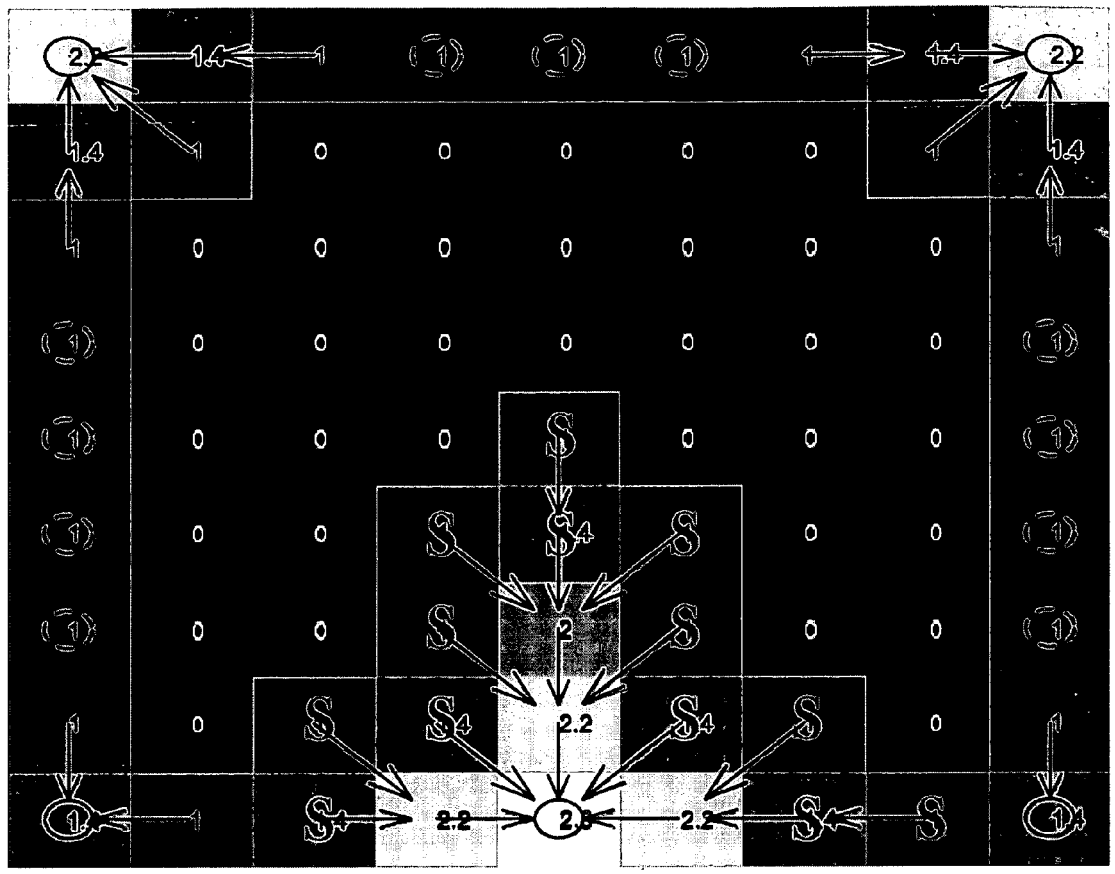
FIG. 7 depicts a final extracted polyp surface, according to an embodiment of the invention.
Figure 8:
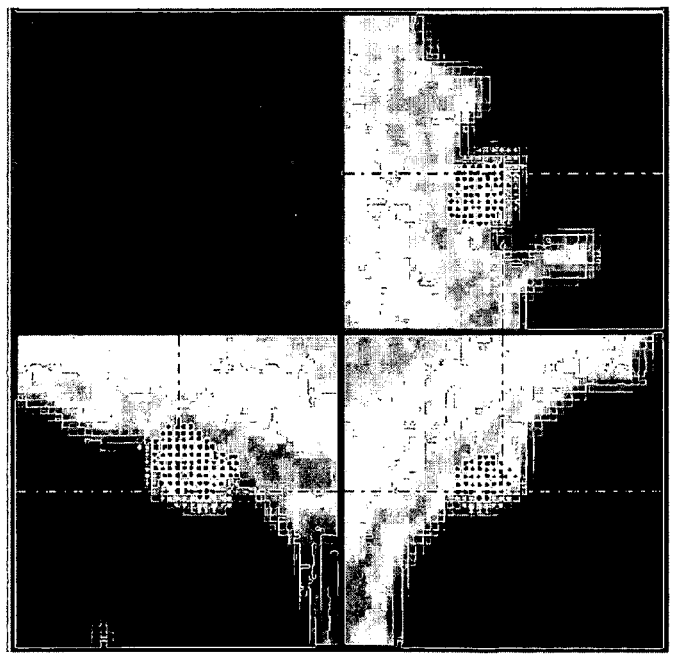
FIG. 8 depicts three orthogonal views that illustrate the result of extracting the toboggan cluster as applied to the 3D volume from FIG. 2, according to an embodiment of the invention.
Figure 11:
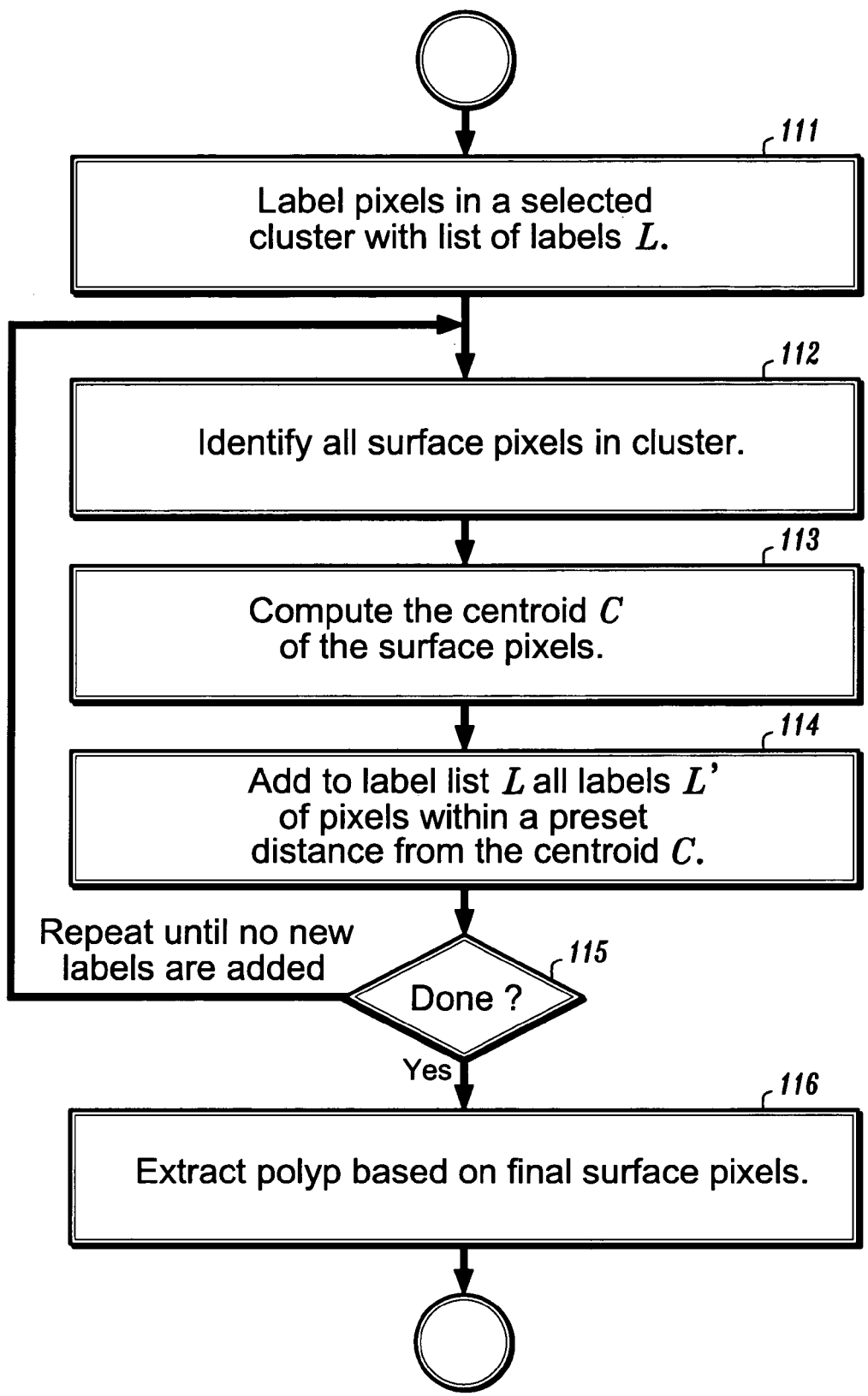
FIG. 11 depicts a flow chart of a toboggan cluster merger, according to an embodiment of the invention.

FIG. 11 depicts a flow chart of a strategy for merging clusters, according to another embodiment of the invention. The merge starts at step 111 by labeling pixels in a selected cluster with a list of labels L. Based on the labels L, all surface voxels S can be easily identified 112 based on the distance map. For example, referring to FIG. 6, the surface pixels depicted therein are those whose distance transform value is 1. Next, at step 113, compute the centroid C of the surface points S, and then at step 114 add to the cluster labels L all the labels L' within a predetermined distance from location C. The above steps of identifying surface pixels, computing a centroid, and adding labels to L should be repeated until 115 no new labels are added to L. The polyp can be extracted 116 based on the final surface voxels S. FIG. 7 depicts a final extracted polyp surface. Referring to the figure, those pixels marked with S identify the border (outer layer) of the toboggan cluster. Note also the clusters about the pixels in the two upper corners of the figure. These are separated from the object of interest along the lower edge of the figure, and are thus not included in the merge with that cluster. For simplicity only one such cluster merge is discussed. FIG. 8 depicts three orthogonal views that illustrate the result of extracting the toboggan cluster as applied to the 3D volume from FIG. 2. The object of interest is indicated by the cluster of dots in the center of each of the three orthogonal views. Specifically, the outer layer (indicated by S in FIG. 7) is shown here with the white dots, and the internal points on the cluster are indicated by the dark dots. Only one cluster is shown for simplicity.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 10:
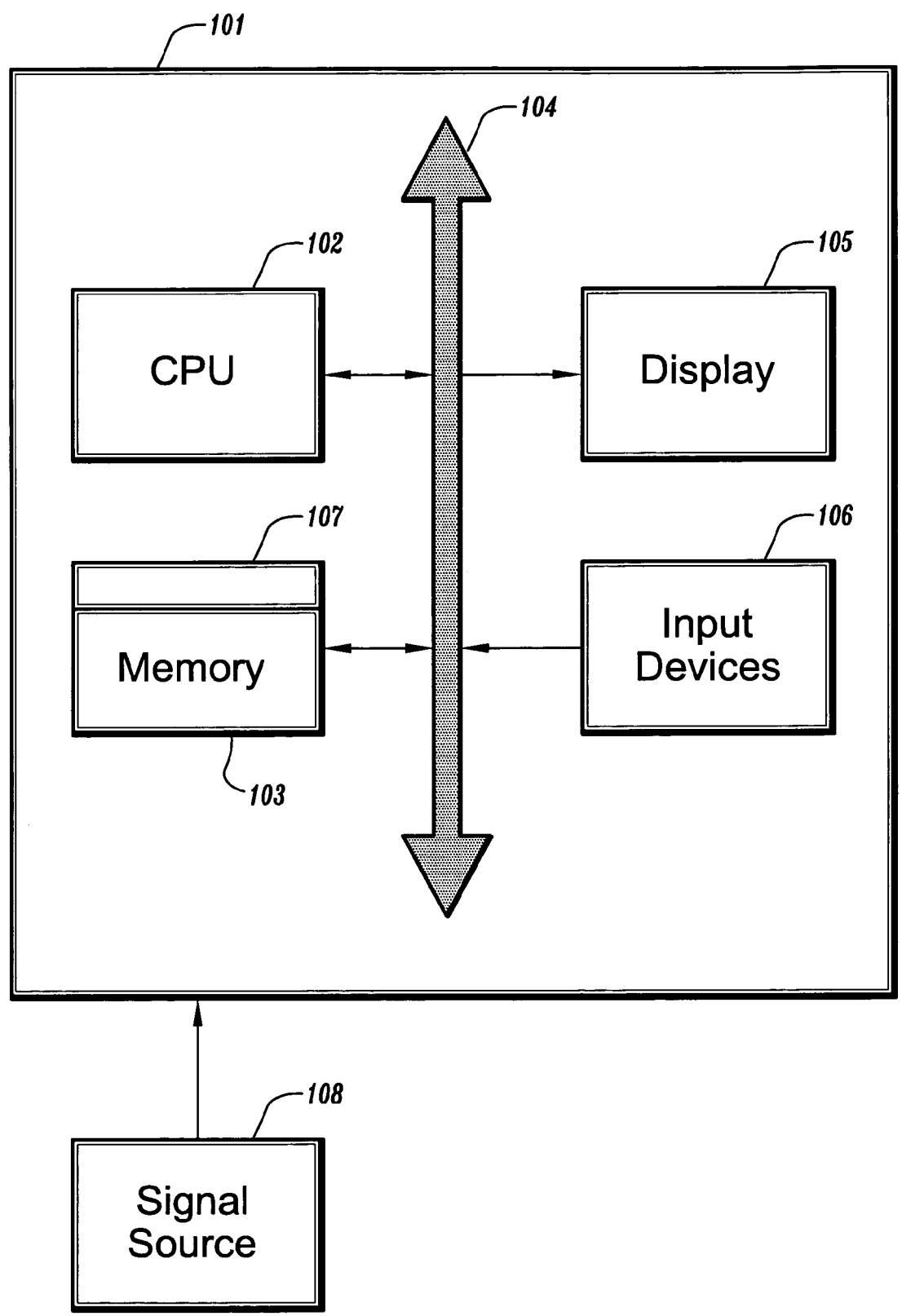
FIG. 10 is a block diagram of an exemplary computer system for implementing a toboggan-based segmentation scheme according to an embodiment of the invention.

Referring now to FIG. 10, according to an embodiment of the present invention, a computer system 101 for implementing the present invention can comprise, inter alia, a central processing unit (CPU) 102, a memory 103 and an input/output (I/O) interface 104. The computer system 101 is generally coupled through the I/O interface 104 to a display 105 and various input devices 106 such as a mouse and a keyboard. The support circuits can include circuits such as cache, power supplies, clock circuits, and a communication bus. The memory 103 can include random access memory (RAM), read only memory (ROM), disk drive, tape drive, etc., or a combinations thereof. The present invention can be implemented as a routine 107 that is stored in memory 103 and executed by the CPU 102 to process the signal from the signal source 108. As such, the computer system 101 is a general purpose computer system that becomes a specific purpose computer system when executing the routine 107 of the present invention.

The computer system 101 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of segmenting an object in a digital image, comprising the steps of:

providing a digital image comprising a plurality of intensities corresponding to a domain of points in a N-dimensional space;

computing a distance map for a plurality of points in said image;

tobogganing each of said plurality of points in said image based on said distance map;

selecting a plurality of clusters, wherein said selected clusters are associated with a set of labels;

selecting one of said plurality of clusters;

identifying surface points based on said distance map, wherein a surface point is a point on a border of an object of interest;

computing a centroid of the surface points;

adding to said selected cluster those points corresponding to other labeled clusters within a preset distance from said centroid; and wherein the computing steps, the selecting steps, the identifying step and the adding step are performed by a computer.

2. The method of claim 1, further comprising selecting a region of interest in the image, wherein said distance map is computed for points in said region of interest.

3. The method of claim 2, further comprising imposing a constraint on the intensity values of the points in said region of interest, wherein an object of interest is defined by points that satisfy said constraint.

4. The method of claim 3, further comprising binarizing said region of interest based on said constraint, wherein pixels whose intensity value satisfy said constraint are assigned one binary value, and pixels whose intensity value do not satisfy said constraint are assigned another binary value.

5. The method of claim 3, wherein said constraint takes the form of an inequality relationship between a pixel value and one or more threshold values.

6. The method of claim 5, wherein said inequality includes a first threshold value and a second threshold value greater than said first threshold value, said object of interest is further defined by points with an intensity above said first threshold value and below a second pre-determined threshold, and further comprising forming a ternary map of said image, wherein pixels whose intensity is below said first threshold are assigned a first ternary value, pixels whose intensity is equal to or above said second threshold are assigned a second ternary value, and pixels whose intensity is between said first threshold and said second threshold are assigned a third intensity value, wherein said distance is computed for those pixels corresponding to the third ternary value.

7. The method of claim 6, wherein the distance map for each point in said object of interest is determined by the distance of each point in said object of interest to a nearest point with a first ternary value.

8. The method of claim 1, wherein said distance map for each point is determined by the distance of each point in said an object of interest to a nearest point outside said object of interest.

9. The method of claim 8, wherein said distance map is a Euclidean distance.

10. The method of claim 1, wherein tobogganing each point comprises sliding each point towards a nearest neighbor point with a largest distance magnitude.

11. The method of claim 10, wherein a point whose distance magnitude is greater than that of its nearest neighbors is a concentration location that does not slide.

12. The method of claim 11, wherein a cluster is defined by a group of points that all slide to a same concentration location.

13. The method of claim 1, wherein said steps of identifying surface points, computing a centroid, and adding to said selected cluster are repeated until no new points corresponding to other labeled clusters are added to the selected cluster, and further comprising extracting said object of interest as defined by said surface points.

14. The method of claim 1, further comprising determining a distance threshold, and tobogganing only those pixels in the object of interest whose distance map is less than the distance threshold.

15. A program storage device readable by a computer, tangibly embodying a program of instructions executable by the computer to perform method steps for segmenting an object in a digital image, said method comprising the steps of:
provinding a digital image comprising a plurality of intensities corresponding to a domain of points in a N-dimensional space;
computing a distance map for a plurality of points in said image;
tobogganing each of said plurality of points in said image based on said distance map;
selecting a plurality of clusters, wherein said selected clusters are associated with a set of labels;
selecting one of said plurality of clusters;
identifying surface points based on said distance map, wherein a surface point is a point on a border of an object of interest;
computing a centroid of the surface points; and
adding to said selected cluster those points corresponding to other labeled clusters within a preset distance from said centroid.

16. The computer readable program storage device of claim 15, the method further comprising selecting a region of interest in the image, wherein said distance map is computed for points in said region of interest.

17. The computer readable program storage device of claim 16, the method further comprising imposing a constraint on the intensity values of the points in said region of interest, wherein an object of interest is defined by points that satisfy said constraint.

18. The computer readable program storage device of claim 17, the method further comprising binarizing said region of interest based on said constraint, wherein pixels whose intensity value satisfy said constraint are assigned one binary value, and pixels whose intensity value do not satisfy said constraint are assigned another binary value.

19. The computer readable program storage device of claim 17, wherein said constraint takes the form of an inequality relationship between a pixel value and one or more threshold values.

20. The computer readable program storage device of claim 19, wherein said inequality includes a first threshold value and a second threshold value greater than said first threshold value, said object of interest is further defined by points with an intensity above said first threshold value and below a second pre-determined threshold, and further comprising forming a ternary map of said image, wherein pixels whose intensity is below said first threshold are assigned a first ternary value, pixels whose intensity is equal to or above said second threshold are assigned a second ternary value, and pixels whose intensity is between said first threshold and said second threshold are assigned a third intensity value, wherein said distance is computed for those pixels corresponding to the third ternary value.

21. The computer readable program storage device of claim 20, wherein the distance map for each point in said object of interest is determined by the distance of each point in said object of interest to a nearest point with a first ternary value.

22. The computer readable program storage device of claim 15, wherein said distance map for each point is determined by the distance of each point in an object of interest to a nearest point outside said object of interest.

23. The computer readable program storage device of claim 22, wherein said distance map is a Euclidean distance.

24. The computer readable program storage device of claim 15, wherein tobogganing each point comprises sliding each point towards a nearest neighbor point with a largest distance magnitude.

25. The computer readable program storage device of claim 24, wherein a point whose distance magnitude is greater than that of its nearest neighbors is a concentration location that does not slide.

26. The computer readable program storage device of claim 25, wherein a cluster is defined by a group of points that all slide to a same concentration location.

27. The computer readable program storage device of claim 15, wherein said steps of identifying surface points, computing a centroid, and adding to said selected cluster are repeated until no new points corresponding to other labeled clusters are added to the selected cluster, and further comprising extracting said object of interest as defined by said surface points.

28. The computer readable program storage device of claim 15, the method further comprising determining a distance threshold, and tobogganing only those pixels in the object of interest whose distance map is less than the distance threshold.

* * * * *